July 18, 1967   W. BEUSHAUSEN   3,331,562
WINDING FORM MANIPULATING DEVICE FOR STATOR WINDING MACHINES
Filed Jan. 25, 1965   8 Sheets-Sheet 1

Inventor
Willi Beushausen
By Pierce, Scheffler & Parker
Attorneys

Inventor
Willi Beushausen
By Pierce, Scheffler & Parker
Attorneys

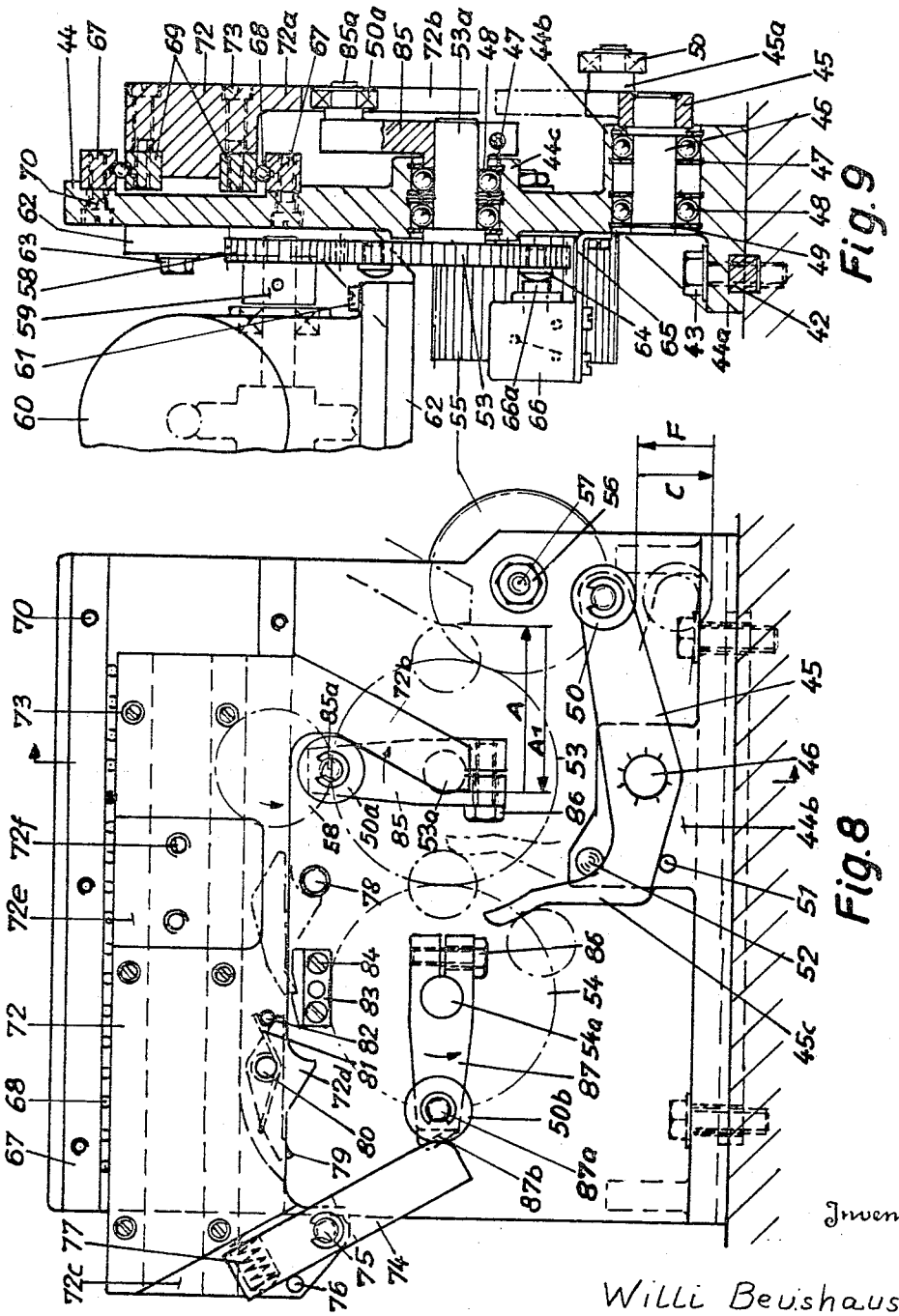

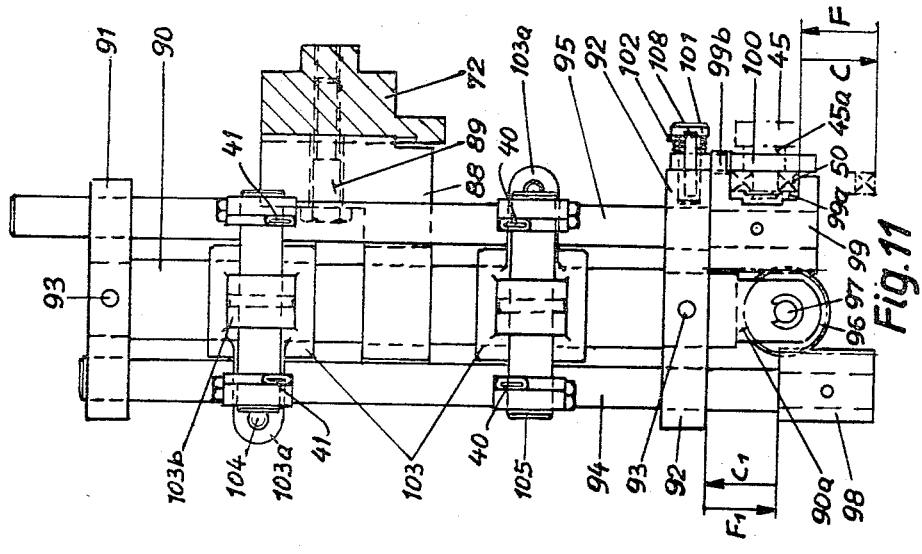
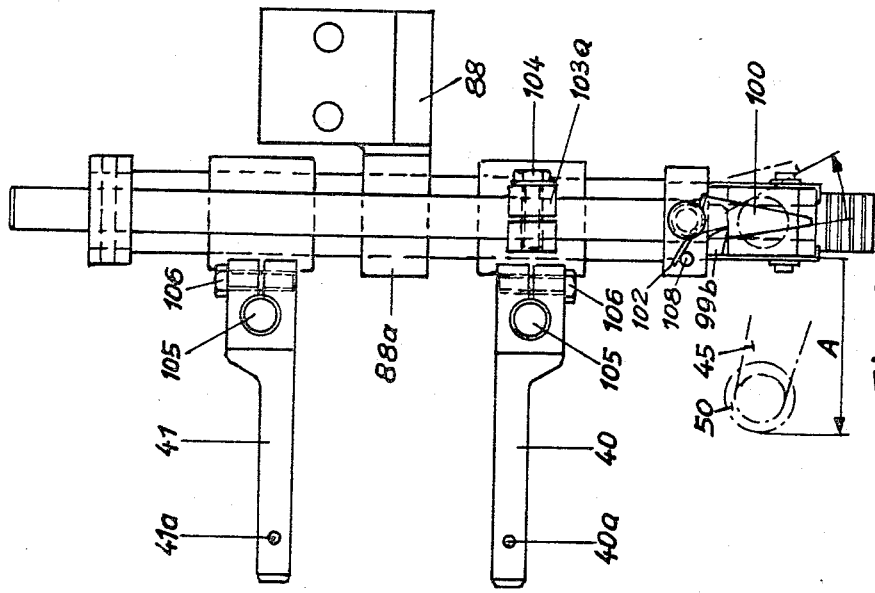

Inventor
Willi Beushausen

United States Patent Office 3,331,562
Patented July 18, 1967

3,331,562
WINDING FORM MANIPULATING DEVICE FOR STATOR WINDING MACHINES
Willi Beushausen, Zurich, Switzerland, assignor to Micafil A.-G., Zurich, Switzerland, a joint-stock company
Filed Jan. 25, 1965, Ser. No. 427,703
9 Claims. (Cl. 242—1.1)

This invention relates to a device which is applicable on known stator winding machines, enabling automatically a safe mounting of the laminated field stacks to be wound and a quick gripping and releasing of the necessary winding formers. The novel means provided for the device allows a winding of the field stacks with a minimum standstill time of the machine.

It is known to join to the field stack prior to the winding, and in a separate working operation, the winding formers consisting of two or four parts, respectively and to loosen them from the field stack after winding. Since these operations require measures to be taken in special devices outside the normal mounting position, periods of standstill of the machine result, which exceed by far the actual winding time. Under these circumstances, a certain reduction of the machine's period of standstill is only attainable, through a second set of winding formers, which can be prepared during the winding process. However, the circumstance of the use of a further device before and after the winding still subsists. According to the invention the winding of field stacks is accomplished by means of, for instance, a vertically moved winding device in which are force-locking joined together in a stack fixture through two forks, laterally reaching from the outside over the poles, altogether four winding formers, two for each pole and each equipped with a clamping piece. Said stack fixture is arranged in the middle of the stroke of the wire guide. After the winding, each of the four winding formers is grasped from behind by a holding finger in corresponding admission openings and after said forks have released the winding formers the latter move vertically upward and as well downward to a distance necessary for the change of the field stack, or in the inverse order, back towards the field stack. Further, the mechanism is so built that the field stacks with their poles on the left and right can be pushed from in front into a fixture, whereby through lateral rails and a rearward stop, a well defined position relative to the winding device of the machine is attained.

The winding formers on the one hand, fit well by means of corresponding sector-like centerings into the bores of the stack and on the other hand the clamping pieces, belonging to the winding formers, protrude up to a shoulder stop into window-shaped bores of the forks, conveyed in guide pieces over the poles; and when the forks move back they firmly and force-locking hold said clamping pieces towards the outside. The movements of the forks occur each separately across two spring-loaded steering levers, but simultaneously due to a join gear coupling of driven cam discs and that on the movement toward the outside always force-locking, on the movement towards the inside, however, mediately through spring action. Further the horizontal and vertical movements of the holding fingers, which are adjustable as to height and side in their gripping devices, take place in suitable straight line guides by means of two oppositely rotating eccentrics and the guiding elements are locked in their definite holding positions, by snapping in latches. Finally, the movement to be performed by the holding fingers on the conveyance or withdrawal of the winding formers in relation to the movements of the forks which are produced by cam discs occur in a suitable invariable rhythm as a result of the use of meshed gears having an equal ratio of transmission by means of the drive of a considerably geared-down, over a three-phase contactor supplied gear motor, equipped with a disc brake effective at standstill and by means of a cam operated limit switch, breaking the control current of the motor contactor.

One suitable embodiment of the invention is illustrated in the accompanying drawings wherein FIG. 1 is a plan view of the device on a stator winding machine;

FIGS. 8 and 9 are a side elevation from the left of the part producing the movements and a vertical section across the same;

FIGS. 10 and 11 are a view of the vertical guide for the holding fingers seen from the side of fixation and a front view.

Figure 1:
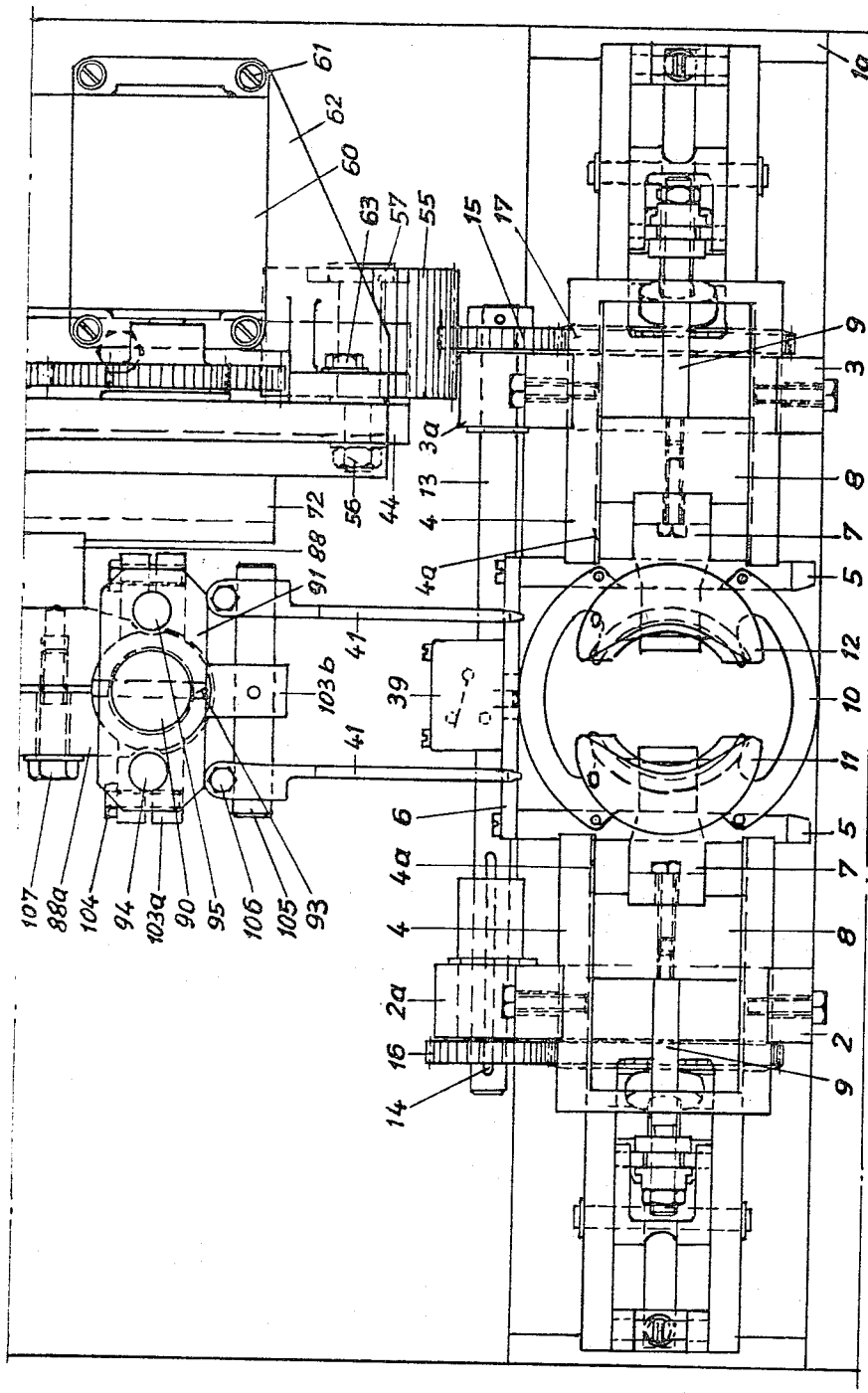

With reference now to the drawings on the bed plate 1 of a vertically working stator winding machine, which for itself is not a part of the invention are mounted, as seen from above (FIG. 1) and from in front (FIG. 2) on the left a bearing bracket 2 and on the right a bearing bracket 3, arranged in mirror image at each side of a wire guide 112 shown in dash-dotted outlined form only. Both bearing brackets 2 and 3 are displaceable for the necessary distance towards or away from each other on a guiding bed 1a on the table plate and each fastened by a screw 32 and prismatic nut 33 in groove 16. In the forked recesses of each of the two bearing brackets is attached at the same height a U-shaped guide piece 4 with an inwardly directed opening. The opening of each guide piece 4 is closed by a guide rail 5 through a screw joint, the width and length of which rail has to correspond with the field stack 10, shown as an example in the gripped state FIG. 1. The guide rails are screwed from behind to a bridge 6, against which fit the field stacks during winding. Both guide rails 5 and the bridge 6 form the gripping point for the field stacks. A limit switch 39 fastened from behind in about the middle to the bridge 6, whose actuating rod protrudes approximately a few tenth millimetres out from a bore through the bridge serves as a control for the correct position of the field stacks in the gripping location. On the inside of each of the two guide pieces 4 a jaw 8 is provided for, which is easily displaceable in guide slots 4a. Toward the centre of fork 7 constructed as an interlocking element is screwed into slot-like countersinkings of each jaw 8. Towards the outside a bolt 9 with an adjustable tappet shell 21 checked by lock nut 22, put on its threaded end, is screwed into each jaw 8.

Figure 2:
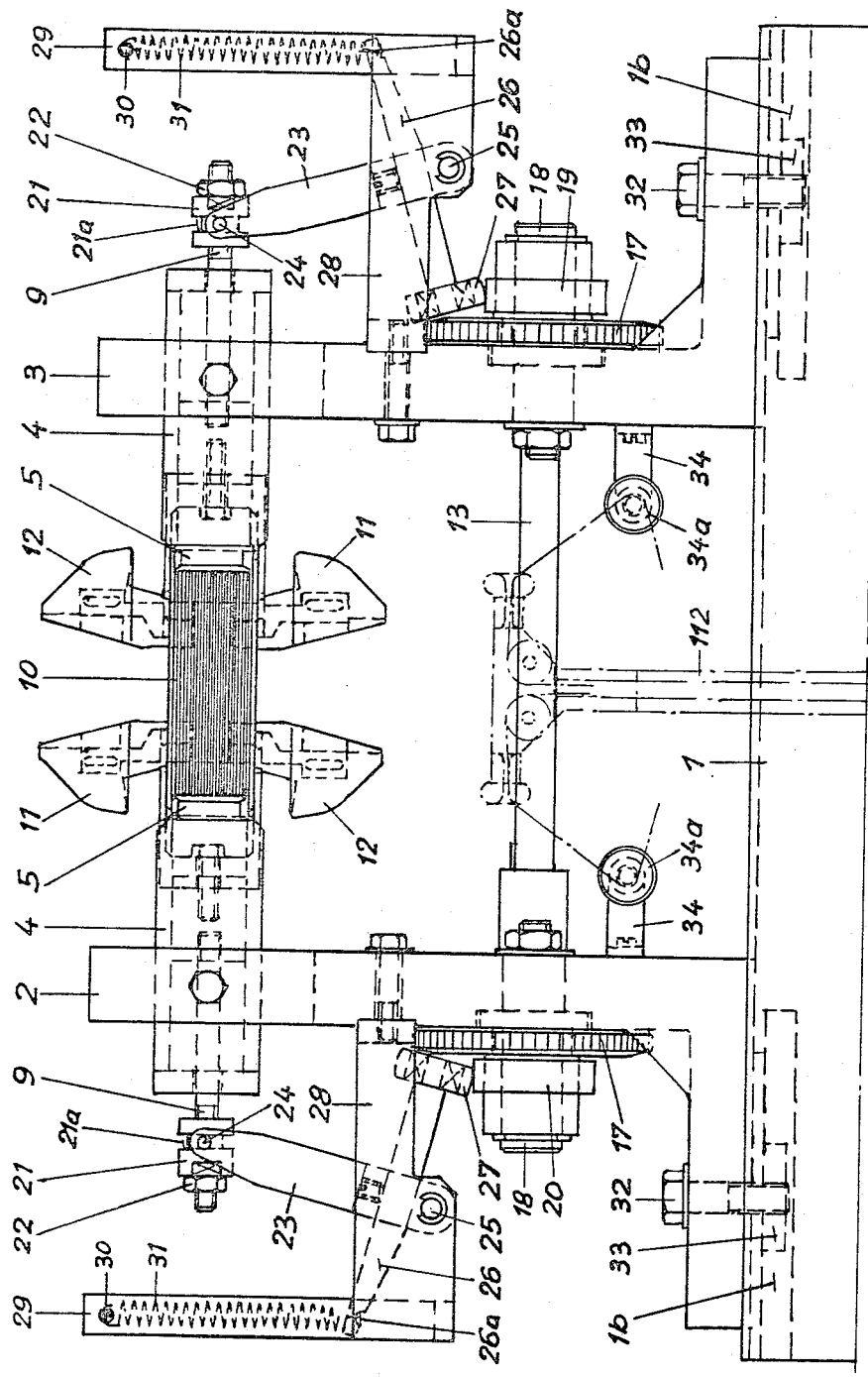
FIG. 2 is a front elevation of the admission parts with inserted field stack and fixed winding formers.

In the eyes 2a and 3a provided at the rear of the bearing brackets 2 and 3 a shaft 13 is placed in bores aligned to each other. To the right of eye 3a a gear 15 is firmly secured to the shaft 13. By means of a safety ring, sitting on it to the left of eye 3a, said shaft is axially secured. In the eye 2a of the bearing bracket 2 a gear 16 constructed as a slide bearing for the shaft 13 is provided for, likewise axially secured by a safety ring and easily rotatable. The coupling of the gear 16 with the shaft 13 takes place through a slot wedge 14. Further, each of the two gears 15 and 16 of equal size with regard to the number of teeth meshes with a gear 17, each placed on an axle bolt 18 at the same height, however, seen from above, in the middle of the bearing brackets 2 and 3 and axially secured by a safety ring (FIG. 2). Cam discs 19, 20 are firmly pressed onto each of the gears 17, whereby the form of the cams is arranged in mirror image due to the like sense of rotation of the gears.

About in the middle between the axle bolts 18 and the guide pieces 4 (FIG. 2) a fork-shaped support 28 is firmly screwed to the bearing brackets 2 and 3 in slot-like recesses, directed towards the outside. To both supports 28 is welded at their outer ends a fork-like brace 29 pointing upward. A rotatable steering lever 23 mounted pivotally on shaft 25 within each support 28. To the lower part of each steering lever 23 is fastened by threaded pins in bores, vertical to the pivot shaft, an arm 26, which projects about equally towards both sides of the lever. A roller 27 is mounted at the inner end of each arm which engages the surface of the corresponding cam 19, 20 and the opposite or outer end of each arm is secured by an anchor pin 26a to the lower end of tension spring 31. The upper end of spring 31 is anchored at pin 30 which extends outwardly from a brace 29 mounted on support 28, and these springs cause the rollers 27 to engage their associated cams with a pressure contact. The part of the cam rolls 27 against the cam discs 19 and 20. The part of the steering levers 23 pointing upward is likewise formed as a fork, into each limb of which is pressed in a pin 24, projecting inward. The pins 24 protrude into the slots 21a of the tappet shells 21 and thus transmit the position changes, produced by the cam discs 19 and 20, to the jaws 8 and thus to the forks 7.

On the lower part of each of the bearing brackets 2 and 3 is fastened from the inside about in the middle, an angular bracket 34 with a milled nut 34a for the fixation of the coil leading ends of the wire, which immediately emerge from the nozzles of the wire guide 112 during the stopping position, as shown as for instance in the drawing.

Figure 4:
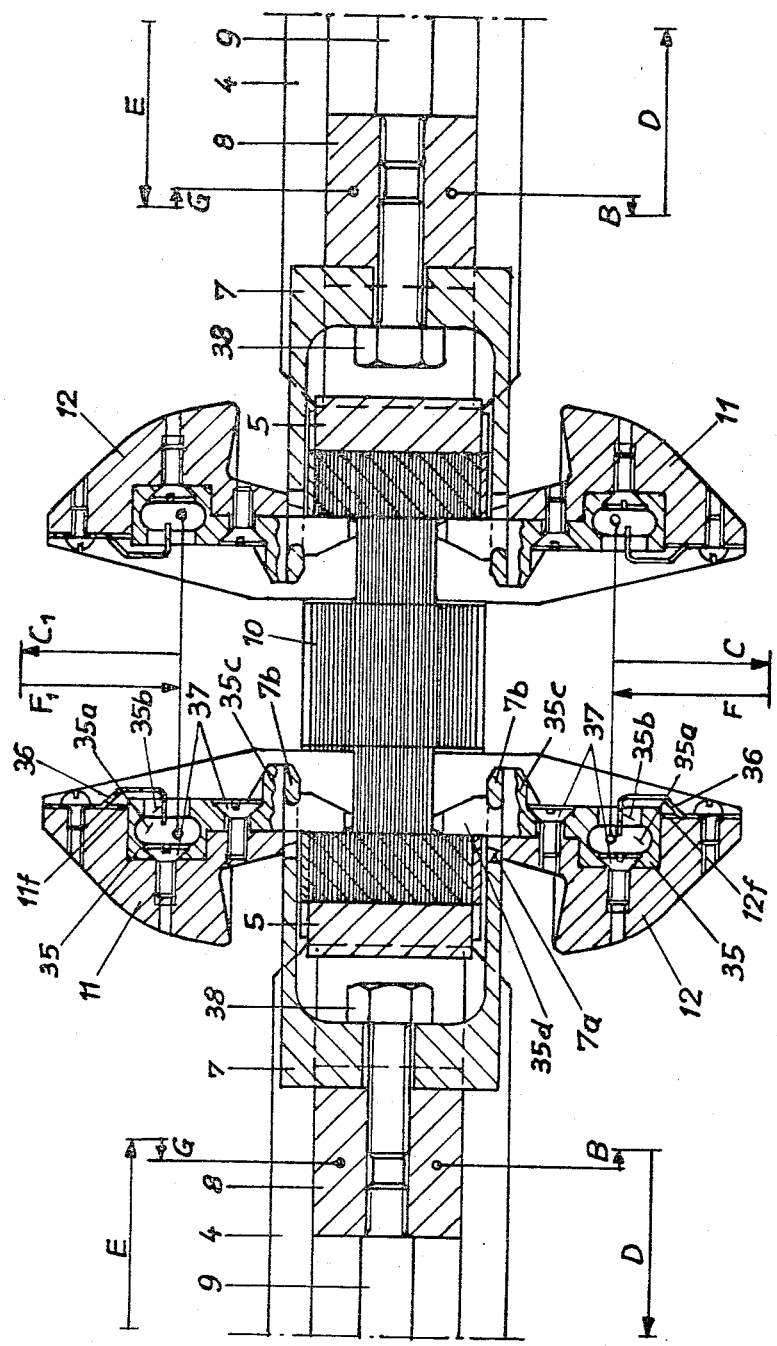
FIG. 4 is a longitudinal section across field stack and winding formers at the gripping location.
Figure 5:
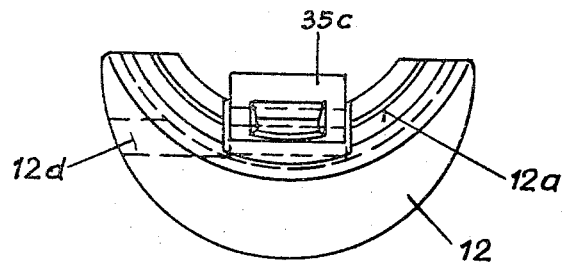
FIG. 5 is a view on a winding former from below.
Figure 6:
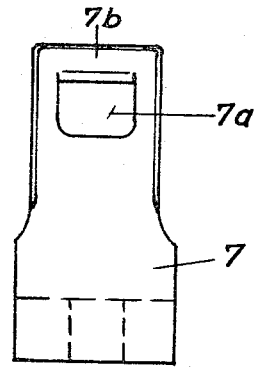
FIG. 6 is a plan view of a fork.
Figure 7:
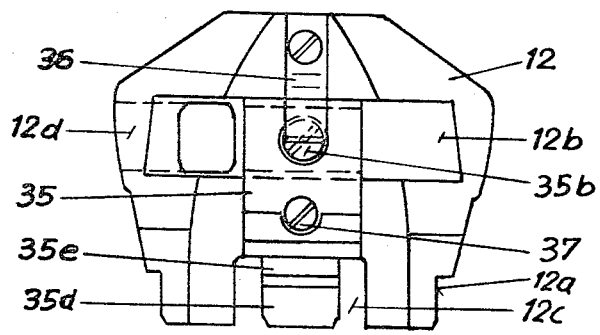
FIG. 7 is a view on the inside of a winding former.

To each coil, which is to be wound into a field stack a pair of winding formers is co-ordinated, comprising the winding formers 11 and 12 (FIG. 4). The winding former pairs are arranged in mirror image to one another, so that the winding formers, which stand diagonally opposite, are interchangeable. A clamping piece 35 is firmly screwed to each single winding former 11 or 12 by means of two countersunk screws 37. The upper part of a clamping piece 35 protrudes with a shoulder, pointing outward into the concentric turned out recess 12b of winding former 12, drawn as an example (FIG. 7), whilst the middle part is embedded and laterally secured in a vertical countersinking applied to the winding former. The width of this countersinking corresponds to that of the clamping piece. The upper part shows, in addition, an admission opening 35a with an oblong section, which latter corresponds in height and direction with an oblong opening 12d, equal in size and milled from one side and from outwards into the winding former. The sectional center line of this opening is the tangent to the center of gravity circle through the turned out recess 12b and runs parallel to the milled straight inner surface of the winding former. The lower part of each clamping piece is enlarged to a foot 35c, to which joins a holding tongue 35d (FIG. 7) whose width again corresponds to the cleared width of the bores 7a in the forks 7 (FIG. 6). Immediately below the foot 35c, a half-circle-shaped slot 35e runs parallel to the supporting face, into which slot meshes during the interlocking the corresponding beveled holding bridge 7b of the fork, whereby the clamping piece 35 together with winding former is drawn against the inner field stack surface. The rectangular recess 12a, turned out of the winding former 12 and the holding tongue 35d have the same radius as the field stack bore. Each winding former shows from below a countersinking 12c, the depth of which is even with the face of the foot 35c and whose width has some play as against the halves of the forks 7. In a flat slot 12f, milled in from above into the turned out inside of the winding former, a ratchet spring 36 is embedded and screwed home. The springy part of the ratchet spring is tapered and so bent, that the point protrudes through the bore 35b into the admission opening 35a of the clamping piece 35, and there it is able to ratchet into the ratchet bore 40a or 41a of an inserted holding finger 40 or 41 (FIG. 10).

The rearward part, provided to produce the various movements of the components of the device is likewise so mounted on the bed plate 1 by means of an inserted slot wedge 42 and of two screws 43, that the center of the vertical guide for the holding fingers 40 and 41 points to the middle of the gripping point of the field stacks (FIGS. 1, 8 and 9). A mechanical connection to the rearward part exists only through the meshing of the gear 15, firmly secured to the shaft 13 with the intermediate gear 55. All structural details of the rearward part are carried by a bearing support 44 equipped with a foot plate 44a as a base of fixation. A control lever 45 with a welded-in axle 46 is rotatably placed in an eye 44b adjacent to the foot plate 44a. The bearing is located within two ball-bearings 48 axially locked by two safety rings 47. A further safety ring 49 on the axle 46 locks the latter within the ball bearings 48. To the arm part pointing to the front, a roller in the form of a ball bearing 50 is added, mounted on the axle bolt 45a. The portion of the arm part 45c, which is directed to the rear, forms an angle and points upwards, suitable to turn the control lever 45 in defined sequence to the right into the dash-dotted position, respectively, to the left into the home position by means of two ball bearing type rollers 50a, 50b used as oppositely rotating eccentric rolls. The arm part 45c in its home position then abuts downward against a pin 51 in the eye 44b, whilst from above a spring loaded ball 52 likewise inserted in the eye 44b, presses from behind with ratcheting effect against the upper edge of the arm.

Exactly vertically above the bearing of the control lever 45 a gear 53 is placed in the eye 44c such that the gear teeth project from the outside wall of the bearing support 44 and the axle end 53a towards its inside. Towards the rear, in an analogous manner a gear 54 of equal size is placed at the same height, meshing with the gear 53. The gears 53 and 54 are in addition equal regarding the number of teeth with the gears 17, each of which is placed on an axle bolt 18 fastened to the bearing brackets 2 and 3. The mounting of each of the gears 53 and 54 is effected through two ball bearings 48 and stub axles 53a, 54a, respectively the bearings being axially secured by four safety rings 47. Further to the front, on the outside wall of the bearing support 44, an intermediate gear 55 is rotatably placed by means of an axle bolt 57 attached to the wall through the nut 56. Towards the rear, the intermediate gear 55 meshes with the gear 53 and toward the front with the gear 15. Finally the gear 53 is meshed with the driving pinion 58, which is secured to the drive shaft 59 of a gear motor 60 equipped with stop brake. The gear motor 60 is fastened by four screws 61 to a support 62, which again is attached to the outside wall of the bearing support 44 through two screws 63. Underneath the middle of the gear 53, an angular metal sheet 65 is fixed to the bearing support 44. A limit switch 66 is so screwed to the angular metal sheet that two cams 64 pressed into the gear 53 and there arranged in equal distance from the center, 180° apart, bring about sure switch-overs on sliding over the end of the axially movable switch contact actuating pin 66a.

To the upper inside of the bearing support 44 are fastened, each by three screws 70, the stationary halves 67 of two each a ball cage 68 comprising pairs of guide rails at a definite distance above one another. The movable halves 69 are each firmly connected to a carriage 72 by three screws 73. The cantilever 72a projecting downward from the carriage 72 possesses an onsliding arm 72b, which, as seen from in front, is inclined at about 30° downward and toward the rear. On the opposite side an on-sliding lever 74, aligned with the on-sliding arm 72b and arranged to the latter in mirror image regarding its position, is rotatable around a pressed in pin 75, placed in the recess 72c. In the upper part of the on-sliding lever 74 a compression spring 77 is fitted in, constantly pushing the on-sliding lever aaginst the positioning pin 76, however, giving way as far as the striking of the upper lever part against the carriage wall in order to avoid a blocking at the start of the rotatory movements of the two eccentric arms 85 and 87. A nose 72d, to the right of the on-sliding lever 74 and projecting in prolongation of the cantilever 72a serves to stop the carriage 72 in its dash-dotted indicated position against a pin 78 pressed into the wall of the bearing support 44. Above the nose 72d, on the rearward side of the cantilever 72a is placed a lever 79 rotationally around a pin 80 which is firmly pressed in from behind. In its home position the lever 79 fits with its right side due to the effect of a torsion spring 81, placed around pin 80 between cantilever 72a and lever 79 against a pin 82, likewise fastened to the cantilever. The pin 80, provided with a shoulder and moving together with the carriage has a safety distance of about one millimetre to the lower half of the guide rails 67. A notched ratchet piece 83 is so fastened above the bearing of the gear 54 on the inside wall of the bearing support 44 by means of screws 84 and a peg, that on striking of the nose 72d against the pin 78 the lever 79 ratchets into the notch of the ratchet piece 83. Thereby the lever 79 ratchets only by one half into the ratchet piece 83 and protrudes with half of its breadth.

To the axle end 53a of the gear 53 an eccentric arm 85 is clamped in its home position pointing upward by means of a screw 86 thereby realizing at the same time a securing in the bearing (FIG. 8). At a distance from the axle, corresponding to the radius of the pitch circle of the gear 53 is mounted on a stub axle 85a in the eccentric arm 85 likewise the previously mentioned roller 50a and secured by a safety ring. Thereby the roller 50a comes to stand on the middle of the breadth of the on-sliding arm 72b. In the same manner an eccentric arm 87, in its home position pointing horizontally to the rear is clamped to the shaft end 54a of the gear 54 by means of a screw 86. The previously mentioned roller 50b is likewise mounted on the axle part 87a of the eccentric arm 87. The eccentric arm 87 is in addition enlarged by welding a hardened cam 87b to its end covering about half the arm breadth and being even with the front face of the arm. The highest point of the cam roundness lies contrary to the sense of rotation, indicated by arrow above the fictitious center line between the shaft end and the axle part 87a. The eccentric arm 87 rotates in the direction of the arrow and pushes the cam 87b against the half-way protruding point of lever 79, thus releasing the interlocking of the carriage 72 in its front position at the moment, in which roller 50b touches the on-sliding lever 74, performing the return movement of the carriage.

A recess 72e made in the carriage 72 and two threaded bores 72f therein are provided for mounting support 88 carrying the vertically moved elements which is fastened by two screws 89 (FIGS. 10 and 11). The clamping eye 88a of the support is placed at a certain distance to the carriage 72 and from the point of fastening towards the front.

A vertical column 90 is firmly gripped in desired position by the clamping eye 88a and a screw 107 (FIG. 1). On a portion with reduced diameter at the upper end of the vertical column 90 a guide plate 91 is put on with, as seen from above, its long side vertical to the carriage 72 and secured by a pin 93. On a somewhat longer portion with reduced diameter at the vertical column's lower end a guide plate 92 is fastened and secured in the same manner. The two guide plates are arranged exactly over one another and each plate is provided on the center line with two bores, having the same distance from the middle, in which bores on the left a rod 94 is vertically guided and on the right a rod 95. The longer reduced portion at the lower end of the vertical column 90 includes a slit 90a arranged in parallel to the guide plate 92. A rotatable gear 96, mounted on a shaft 97, passing through the center of the column occupies the whole width of slit 90a. On the left side the gear 96 meshes with a rack 98, pressed onto the rod 94 and secured by a pin. On the right side the gear 96 is in mesh with a rack 99, pressed onto the rod 95 and secured by a pin. The rack 99 possesses a forklike recess 99a on the side opposite the rack teeth provided for the admission of the axle 45a with roller 50 on the control lever 45. In addition the upper half of the fork of the rack 99 includes a nose 99b, projecting to the right. On the right side of the guide plate 92 a lever 100 is placed rotatable around a horizontally pressed in axle bolt 101. This lever in its resting position ratchets at the nose 99b due to the action of a torsion spring 102, mounted likewise on the axle bolt 101 and having one end thereof pressed against a pin 108. Thus, the rack 99 including the rod 95 are locked in the upper position. That is to say, lever 100 locks rod 95 in its upper position by means of nose 99b of fork 99a both of which form part of rack 99 secured to rod 95. This upper position of rod 95 corresponds to the lower position of rod 94 and to the rearward position of carriage 72, whereby all winding formers 11, 12 are put onto the field stack 10 and holding fingers moved out of the winding formers. Thereby the rack 98 including rod 94 are guidedly likewise locked. The interlocking occurs at the moment, in which on the reverse motion of the carriage 72 including vertical column 90 the fork 99a moves away from the roller 50 on control lever 45. In the inverse order, on the admission of roller 50 in the fork 99a, the axle bolt 45a pushes against the lever 100 and brings about the unlocking, as by the dash-dotted lines in FIG. 10. To the lower half of the vertical column 90 an easily displaceable guide sleeve 103 is put on and at the same time firmly tightened to rod 95 by means of screw 104 across the clamping eye 103a, projecting to the right. To the upper half of the vertical column 90 a further guide sleeve 103 is provided, whose clamping eye 103a is tightened to the rod 94, however, projecting to the left. Both guide sleeves 103 include each an eye 103b, projecting from the middle, and in the horizontal cross bore of which a bolt 105 is pressed in, secured by a pin and equally protruding to both sides. As seen from above the bolts 105 stand parallel to the guide plates 91 and 92. To each of both bolts 105 is firmly attached by screws 106 a pair of holding fingers 40 and 41, the distance between which corresponds to that of the oblong admission openings 35a of the clamping pieces 35, fastened to the winding formers 11 and 12 above and below the field stack. Towards the rear the holding fingers 40 and 41 are provided with clamping eyes, whilst the remaining parts are made easily displaceable in the admission openings 35a of clamping pieces 35 of the winding formers 11 and 12 respectively, and for the purpose of better insertion they are tapered in front. At the locations, where the holding fingers enter into the middle of the field stacks they have bores 40a, 41a, respectively, into which ratchet the ratchet springs 36, thus holding the winding formers in the right position when they are not locked to the field stack.

Figure 3:
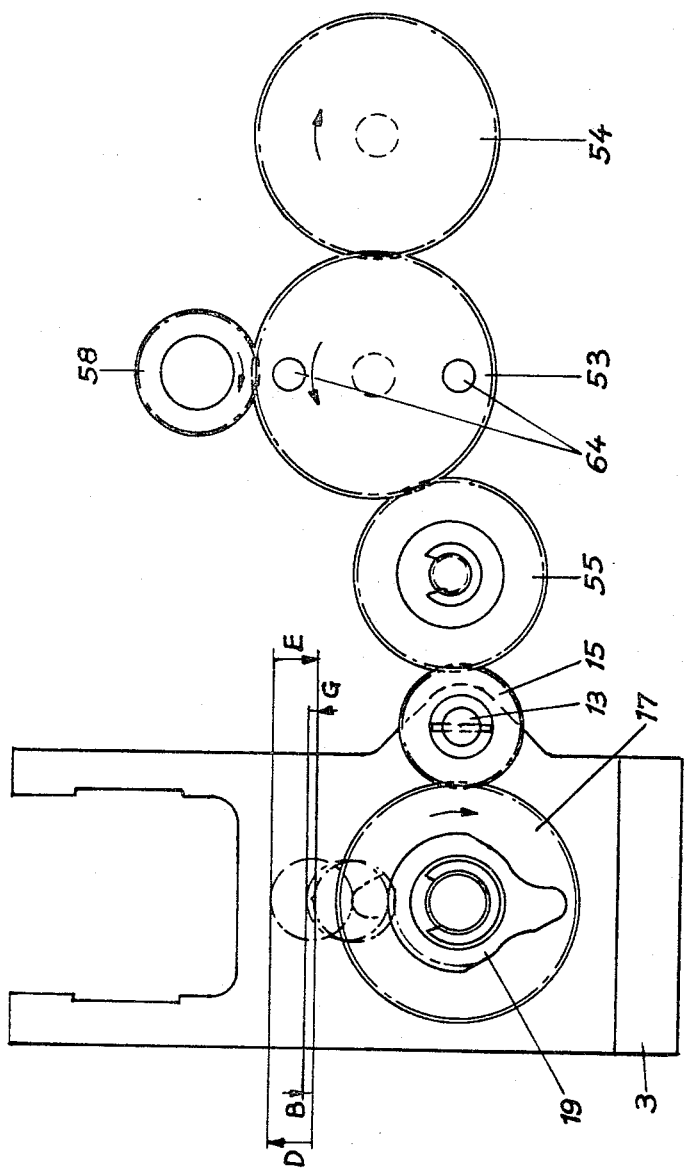
FIG. 3 is a view from the right, concerning only the gear transmission.
Figure 12:
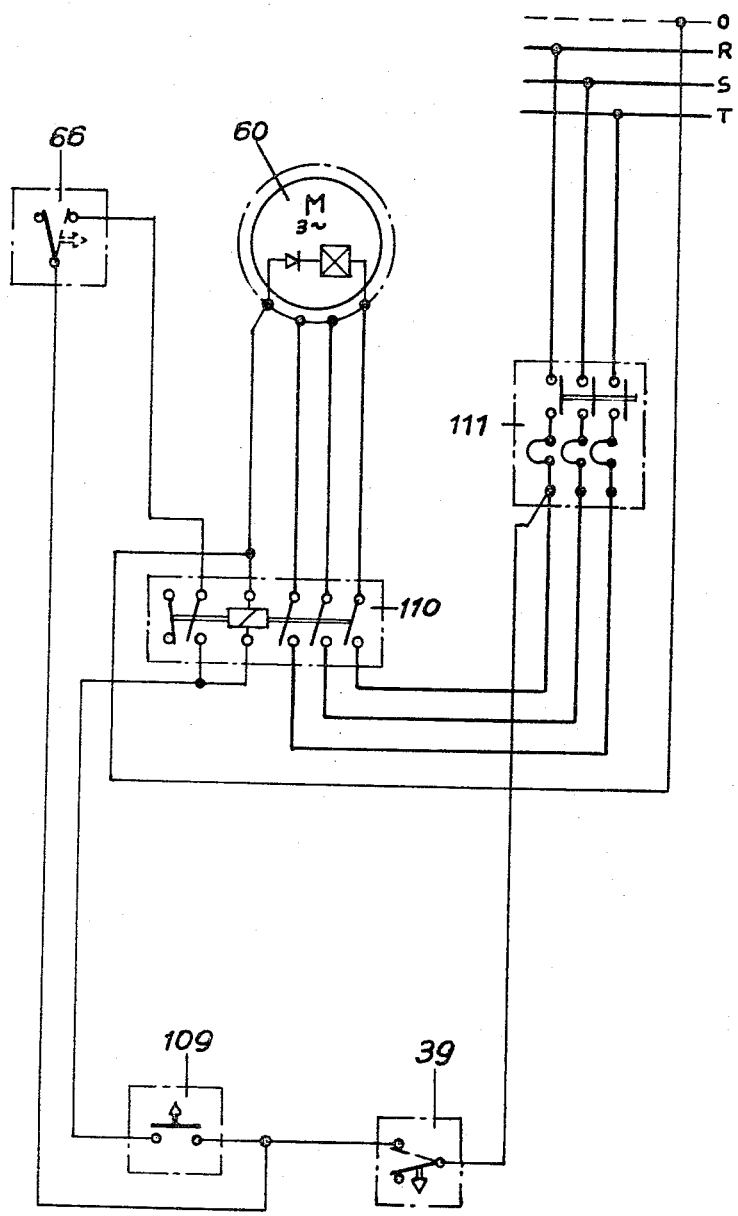
FIG. 12 is an electrical schematic diagram as an example for a push-button control.

A 180° rotation, performed in the direction indicated by the arrow by the gears 17, 53 and 54 is required for each cycle of motions produced by the gear motor 60 across the drive pinion 58 (FIG. 3). The starting of the gear motor 60 is initiated with a closed protective switch 111 across a three-phase contactor 110 by actuating a push button key 109 (FIG. 12). After release of the limit switch 66 into the dash-line position by one of the two cams 64 on gear 53 the further excitation of the three-phase contactor 110 until the next engagement of the cam with the stem 66a, is effected by an additional make contact. Essential for the starting of the gear motor 60 is a striking against the bridge 6 of the field stack when it is inserted into the gripping point, whereby the limit switch 39, arranged in the control circuit must stand in the dash-line position. Consequently, there will be no switching on of the gear motor without any field stack in the gripping point. The push-button key 109, three-phase contactor 110 and protective switch 111 are mentioned merely as an example, because they are placed outside the device.

Proceeding as for instance from an already wound field stack, whose coil wire ends are just newly jammed under and severed (FIG. 2), the following individual motions result: After the switching on of the gear motor the two eccentric arms 85 and 87 begin to rotate in the arrow indicated direction (FIG. 8). Thereby roller 50a, fastened to the eccentric arm 85 rolls down along the side of arm 72b and thus it pushes the carriage 72 including support 88 with vertical column 90 over the distance A into the front position, in which the carriage is locked through striking of the nose 72d and due to the falling in of the toe of lever 79 into the notch in ratchet piece 83. With this movement, which is finished after an arm rotation of 90°, the holding finger pairs 40, 41, fastened to the guide sleeves 103 are pushed as far as the catching of the ratchet spring 36 into the admission openings of the winding formers including clamping pieces 35 (FIGS. 1 and 4). Spring 36 serves to hold the clamping pieces 35 and winding formers 11, 12, in place when removed from field stack. Springs 36 ratchet into bores 40a, 41a of the holding fingers 40, 41.

At the same time the roller 50 on the control lever 45 moves into the fork 99a of the rack 99, thereby releasing the interlocking of the lever 100 with the nose 99b (FIGS. 10 and 11). With the further rotation of arms 85, 87 between 95° and 115° the releasing stroke B is performed at the inclined portion of the cam discs 19 and 20 under effect of the draw springs 31 onto the steering lever 23, whereby both forks 7 are released from the interlocking with the clamping pieces 35 (FIGS. 2 and 4). This release from the interlocking as between winding formers 11, 12 and the clamping pieces 35 is necessary to permit withdrawal of these members from the field stack. The back movement D of forks 7 can occur only subsequent to this withdrawal. In the range of an angle of rotation between 120° and 180° arms 85, 87 the roller 50b on the eccentric arm 87 strikes from the left against arm 45c of the control lever 45, thereby effectuating the downward movement C of the rack 99 and the upward movement $C_1$ of the rack 98 (FIGS. 8, 10 and 11). As the movement of the racks 98 and 99 are directly transmitted to the holding finger pairs 40, 41 across the rods 94 and 95 as well as across the guide sleeves 103 also, all winding formers perform the movements C, $C_1$ respectively. As soon as the movements C and $C_1$ occur, the holding tongues 35d leave the bores 7a of the forks and thus the guided back movement D of both forks 7 takes place during the rotation of the gears 17 between 135° and 180° due to the steep ascent of the cam discs 19 and 20. When the gear motor is disconnected due to the sliding of one of the cams 64 onto the limit switch actuating stem 66a, the winding cycle ends as coil wire beginnings are jammed under the milled nut and cut, whereupon the change of the field stack can take place.

The conveyance of the winding formers to the field stack, i.e., movement G which is the reverse of movement B and the interlocking with the same occurs in reverse order with the gear motor rotating in the same sense. At the beginning of rotation over a further arc of 180° the cam discs 19 and 20 are in the dash-dotted position (FIG. 3), whilst the eccentric arm 85 points vertically downward and the eccentric arm 87 horizontally forward. For the control lever 45, the starting position is likewise indicated dash-dotted (FIG. 8). Then a quick preliminary forward movement E of the two forks 7 ending already after 30°, takes place as a result of the steep descent of the cam discs 19 and 20 and with the aid of the draw springs 31 acting upon the steering levers 23. During a rotation of the eccentric arm 85 between 20° and 50° the roller 50a on this arm slides onto the right side of the arm 45c and thus performs, through rotation to the left of control lever 45, the upward movement F of rack 99, and the downward movement $F_1$ of rack 98, by which movements the winding formers finally abut from below and above through the stopping of shoulder faces 35c against the outer surfaces of forks 7 and by which the recesses 12a, as well as the holding tongues 35d are guided into the field stack bore (FIG. 4). Since the preliminary movement E is terminated by a 20° portion of the angle of rotation earlier than the upward and downward movements F and $F_1$, sufficient safety is provided for a trouble free entry of the holding tongues 35d across the bore 7a in the forks. Hereupon, with a further rotation between 55° and 80° follows immediately the interlocking stroke C, performed by the cam discs 19 and 20 across the steering levers 23, through which stroke the clamping pieces are caught in their half-circle-shaped slots 35e by the holding bridges 7b of the forks and interlocked under force to the field stacks together with the winding formers. The eccentric arm 87, likewise driven and rotating free up to this moment strikes with its cam 87b against the toe of lever 79 when reaching the upward pointing position, thus unlocking the carriage 72 in its front position. With the further rotation between 90° and 180° the roller 50b on the eccentric arm 87 strikes against lever 74 and pushes during the following down sliding movement the carriage 72 together with the vertical column 90 over the distance $A_1$ back to the rearward position, i.e., the starting position whereby all holding fingers 40, 41 are drawn out from the already locked winding formers and moved back. On reaching the starting position, gear motor 60 is disconnected in the previously described manner and braked, whereupon the winding of another empty field stack can be taken up.

Thus it will be seen that a movement of the winding formers 11, 12 and clamping pieces 35 towards an empty field stack 10 for winding a coil thereon, and thence moving these parts in the reverse direction after the coil winding operation has been completed is controlled by the 180° displaced cams 64 on gear 63 which actuate the stem 66a of limit switch 66. After actuating push-button switch 109, the two eccentric arms 85, 87 are set into rotation by means of the gear drive 58, 53, 54. These two rotating arms 85, 87, effect movement of carriage 72 by means of the two depending arms 72b and 74 which they engage. Arm 74 has a limited lever movement, being loaded by spring 77 in order to prevent a blocking of the carriage at the beginning of rotation of arms 85, 87. This beginning position is indicated in FIG. 8. Pin 78 serves as a stop for the carriage in its front position by means of the nose 72d on the carriage. Drive motor 60 can run only when an empty field stack is correctly placed at the gripping location, i.e., if it is pushed so far within the guide rails 5 against bridge 6 that the stem of limit switch 39 is actuated. The interaction of arms 85, 87 with the winding formers 11, 12 occurs by means of the see-saw movement of control lever 45. Roller 50 at one end of lever 45 has moved over it the fork 99a of rack 99 secured to rod 95 when the carriage 72 is in its front position. By means of this arrangement, rods 95 and 94 are thus moved downward and upward respectively thus carrying the holding fingers 40, 41 for the winding formers towards and away from each other.

Since the same number of revolutions of the gear motor is required for each cycle of motions, the running time is equal in both cases and limited to a few seconds.

I claim:

1. Apparatus for holding a two-pole field stack in position for winding of a coil on each pole which comprises means for supporting the field stack, said supporting means including a pair of spaced rails and a rear stop for insertion of the stack to its proper position for winding, a pair of winding formers for each pole to be wound and which are located on opposite sides of said stack, each said winding former including a clamping piece, a clamping fork for each pair of winding formers, means mounting said clamping forks for movement between front and rear positions towards and away from engagement with the clamping pieces of the pair of winding formers coordinated therewith, a carriage, means mounting said carriage for movement along a path transverse to the direction of movement of said clamping forks, two pairs of holding fingers mounted on said carriage, said pairs of said holding fingers being coordinated respectively to the winding formers of each pair, means for shifting said carriage and hence also said holding fingers between said front and rear positions to engage and be disengaged respectively from said winding formers, and means for actuating said pairs of holding fingers and hence also said winding formers when in said front position towards and away from contact with the opposite sides of said field stack, and means for actuating said clamping forks towards and away from said clamping pieces in timed relationship with the actuation of said pairs of holding fingers.

2. Apparatus as defined in claim 1 wherein an electric motor drive is used for effecting the movements of said clamping forks, carriage and holding fingers, and which further includes a safety switch correlated with said rear stop and which is actuated by insertion of a field stack to be wound but only when the stack reaches its proper position for winding, the contacts of said safety switch being included in the control circuit for said electric motor drive.

3. Apparatus as defined in claim 1 wherein each pair of holding fingers is mounted on a movable rod supported by said carriage, said rods are reciprocated in opposite directions and by means of a lever, said lever being in turn actuated in one direction by a first rotatable arm and in the opposite direction by a second rotatable arm.

4. Apparatus as defined in claim 3 wherein said first and second rotatable arms also effect respectively the movement of said carriage between its front and rear positions.

5. Apparatus as defined in claim 1 and which further includes a rotary driven cam and a cam follower and lever mechanism actuated by said cam follower for moving said clamping forks towards and away from the clamping pieces for said winding formers.

6. Apparatus as defined in claim 1 wherein said clamping pieces for said winding formers are provided with openings into which said holding fingers are inserted upon movement of said carriage to its front position.

7. Apparatus as defined in claim 1 and which further includes means for latching said carriage in place when it reaches its front position, and for thereafter unlatching the carriage to permit a return movement to its rear position.

8. Apparatus as defined in claim 1 and which further includes releasable means for preventing movement of said holding fingers when said carriage returns to its rear position.

9. Apparatus as defined in claim 1 and wherein each said clamping piece includes a holding tongue engageable with the fork correlated thereto.

References Cited

UNITED STATES PATENTS

| | | | |
|---|---|---|---|
| 2,847,170 | 8/1958 | Lill et al. | 242—1.1 |
| 2,953,309 | 9/1960 | Moore | 242—1.1 |
| 2,988,291 | 6/1961 | Greene et al. | 242—1.1 |

FRANK J. COHEN, *Primary Examiner.*

B. S. TAYLOR, *Assistant Examiner.*